(12) United States Patent
Fairhurst et al.

(10) Patent No.: US 6,980,257 B2
(45) Date of Patent: Dec. 27, 2005

(54) PLURAL-SOURCE, SELECTABLE, COMBINED IMAGE/TEXT SINGLE-SCREEN DISPLAY

(75) Inventors: Jon A. Fairhurst, Camas, WA (US); Vishnu Kumar Shivaja Rao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 530 days.

(21) Appl. No.: 10/299,531

(22) Filed: Nov. 18, 2002

(65) Prior Publication Data

US 2004/0095514 A1   May 20, 2004

(51) Int. Cl.[7] .......................... H04N 9/74; H04N 5/445
(52) U.S. Cl. ...................... 348/589; 348/600; 348/564
(58) Field of Search ................................ 348/563, 564, 348/565, 566, 569, 570, 584, 588, 589, 598, 348/599, 600, 468, 731, 553, 725; H04N 5/445, H04N 5/45, 9/74, 9/76, 5/50, 5/278

(56) References Cited

U.S. PATENT DOCUMENTS

| | | |
|---|---|---|
| 5,428,400 A | 6/1995 | Landis et al. |
| 5,477,274 A | 12/1995 | Akiyoshi et al. |
| 5,543,851 A | 8/1996 | Chang |
| 5,671,019 A * | 9/1997 | Isoe et al. ................... 348/565 |
| 5,708,475 A * | 1/1998 | Hayashi et al. ............. 348/468 |
| 5,745,184 A | 4/1998 | Neal |
| 5,883,675 A | 3/1999 | Herz et al. |
| 5,995,159 A | 11/1999 | Bae et al. |
| 6,011,594 A * | 1/2000 | Takashima ................... 348/565 |
| 6,243,676 B1 | 6/2001 | Witteman |

* cited by examiner

*Primary Examiner*—Sherrie Hsia
(74) *Attorney, Agent, or Firm*—Jon M. Dickinson, PC; Robert D. Varitz, PC

(57) ABSTRACT

A plural-source-capable, broadcast-reception, audio/video system and methodology which freely enable the simultaneous display, on a single television receiver screen, of different categories of these broadcast-information components which may be being broadcast at the same time from two different broadcast sources.

6 Claims, 1 Drawing Sheet

PLURAL-SOURCE, SELECTABLE, COMBINED IMAGE/TEXT SINGLE-SCREEN DISPLAY

GENERAL INTRODUCTION

This invention relates to broadcast television, and in particular to a system and a method which allow a user to select, for simultaneous presentation on and by his or her television receiver screen, visual, text and/or audio information that are broadcast independently from two different broadcast sources.

The invention responds to a popular user/viewer desire, shared by many people, to be immersed in a dense simultaneity of visual, text and audio broadcast information. For example, a user might wish to be simultaneously taking in the visual and audio information being broadcast by one broadcast source, along with the scrolling text, such as headline bulletin news text, broadcast by another source. The options conventionally available today to do this are not very satisfactory and/or convenient.

For example, one of these options involves using a picture-in-picture approach, wherein substantially the full, undivided information that is broadcast from two different sources may be commonly displayed on a single screen. This option, however, does not allow for segregation and individuation of commonly broadcast visual, text and audio information.

Another conventional approach involves switching back and forth between two different broadcast channels—obviously an approach which does not satisfy the desire for simultaneity.

A third approach according to conventional practice involves simultaneous "watching" of two or more television sets—an expensive and also largely unsatisfying resolution.

A fourth approach proposed according to conventional practice, and one which is similar to the one just mentioned immediately above, involves simultaneously using plural, mixed-categories devices, such as a television set and a radio.

A fundamental issue which lies close to the heart of the unsatisfactory natures of current approaches, such as those briefly outlined above, is that none offers the opportunity for easy segregation and selection, for individuated presentation, of commonly broadcast visual, text and audio information. The present system and method invention directly resolve this issue in a very simple and effective way.

According to a preferred embodiment and manner if practicing the invention, a single television receiver is equipped with two independent broadcast tuners, and also with associated user-operable structure which permits selective user segregation and individuation, for simultaneous display/presentation, of the respective visual, text and audio components that are being simultaneously broadcast by two different broadcast sources. To illustrate by a single, representative example, what this permits, is that a user can select to display and present the visual and audio information coming from one broadcast source, and simultaneously select to view, in a banded area defined on the receiver's display screen, the scrolling text information then being broadcast by another broadcast source. This is but one of many interesting possibilities offered by the structure and methodology of the present invention.

These and other features and advantages which are offered by the invention will become more fully apparent as the description which now follows is read in conjunction with the accompanying drawings.

DETAILED DESCRIPTION OF THE INVENTION

Figure 1:
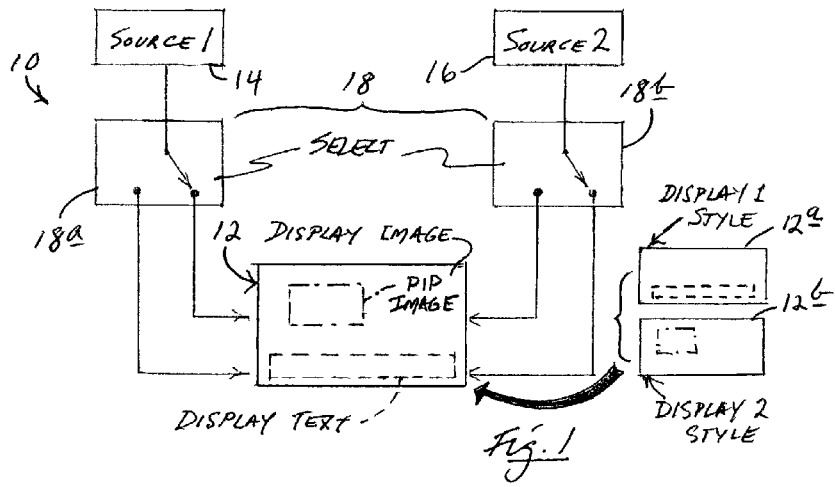
FIG. 1 is a simplified block/schematic diagram of a preferred embodiment, and manner of practicing, respectively, the system and method proposed by the present invention.

Turning now to the drawings, and referring first of all to FIG. 1, indicated generally at 10 is a preferred embodiment of a television-receiver-based system which is constructed in accordance with the present invention, and which practices the preferred method of using this preferred system. System 10 is essentially a specially equipped television broadcast receiver. Block 12 in FIG. 1 represents the single display screen, or display, in receiver 10, and this screen can be thought of as being enabled by this invention to present, selectively, two different kinds of display styles, 12a, 12b (1 and 2, respectively, stylistically illustrated in FIG. 1) for the independent and simultaneous display, according to the invention, of the visual-imagery information being broadcast by one broadcast source, and the scrolling text information which is being broadcast simultaneously by another broadcast source. One display style (12a) integrates scrolling text (dashed-line outline) into a full-screen image display (large, solid-line outline). The other display style (12b) creates a picture-in-picture (PIP) type display format, with a small scrolling text image, for example (dash-dot lines), contained separately within a larger picture image (large, solid-line outline).

Also included in system 10 are two independent, user-operable tuners 14, 16 for receiving broadcast visual, text and audio information, and reception/display control structure represented by a bracket 18, and including control substructures 18a, 18b that are interposed tuners 14, 16 and display screen 12. Control substructure 18a is shown to be associated operatively with tuner 14, and substructure 18b to be associated with tuner 16. Each of control substructures 18a, 18b is capable, according to the invention, of separating and individuating the visual, textual and audio components of the information being broadcast by a selected, tuned-in broadcast source. This capability is made clearly evident in the layout of FIG. 2.

Through an appropriate user interface (not specifically illustrated), a user is permitted to implement certain selection functions with respect to the behaviors of tuners 14, 16, control structure 18, and display 12. Such an interface could, for example, be a screen-displayed menu employable by a user through the familiar use of an infrared signaling remote control device. The interface could be invoked, alternatively, by manual controls provided on a user's television set. Or, the interface could be invoked employing an "on board" computer and an appropriate application which enables user establishment of certain operating "pre-sets". In general terms, such an interface can be conventional in construction.

Not specifically pictured in FIG. 1 (though generally depicted in FIG. 2) is the audio componentry in receiver 10, but it should be understood that such componentry is in fact present, and that it allows for tuners 14, 16, which are also capable of tuning in visual and text information from selected broadcast sources, to tune in the associated audio information. The audio componentry also permits a user to listen to selected, tuned-in audio. Typically, turned-in audio is tightly linked to associated, tuned-in, broadcast visual imagery, and this linkage is assumed here for illustration purposes. Thus, visual (pictorial) information displayed on screen 12 will typically be accompanied by the sound presentation of the related audio information.

In FIG. 1, control substructures 18a, 18b, which are represented internally simply as single-pole, single-throw switches, have been "operated" by the user in such a fashion that associated visual imagery and audio information tuned-in from one broadcast source by tuner 14 are presented to the user, respectively, by display style 12a, and by the audio componentry in receiver 10, and scrolling text information tuned-in from another broadcast source by tuner 16 is presented to the user as an integrated part of display style 12a. By employment of the above generally mentioned user interface, a user can freely and changeably choose to send, simultaneously as a display style 12a to display-screen 12, and as an integrated signal stream, the respective visual and scrolling textual information-contents of information being broadcast at any time by two independent sources of such broadcast information. Presentable audio information which a user receives will typically (though not necessarily) be linked to whatever visual information is then being displayed according to display style 12a.

Similarly, a user can choose to implement display style 12b through appropriate selection of the "positions" of "switches 18a, 18b", whereby two non-integrated and independent data streams create the PIP presentation-layout on screen 12, with scrolling text, for example, constituting the picture-in-picture part of the overall display.

Figure 2:
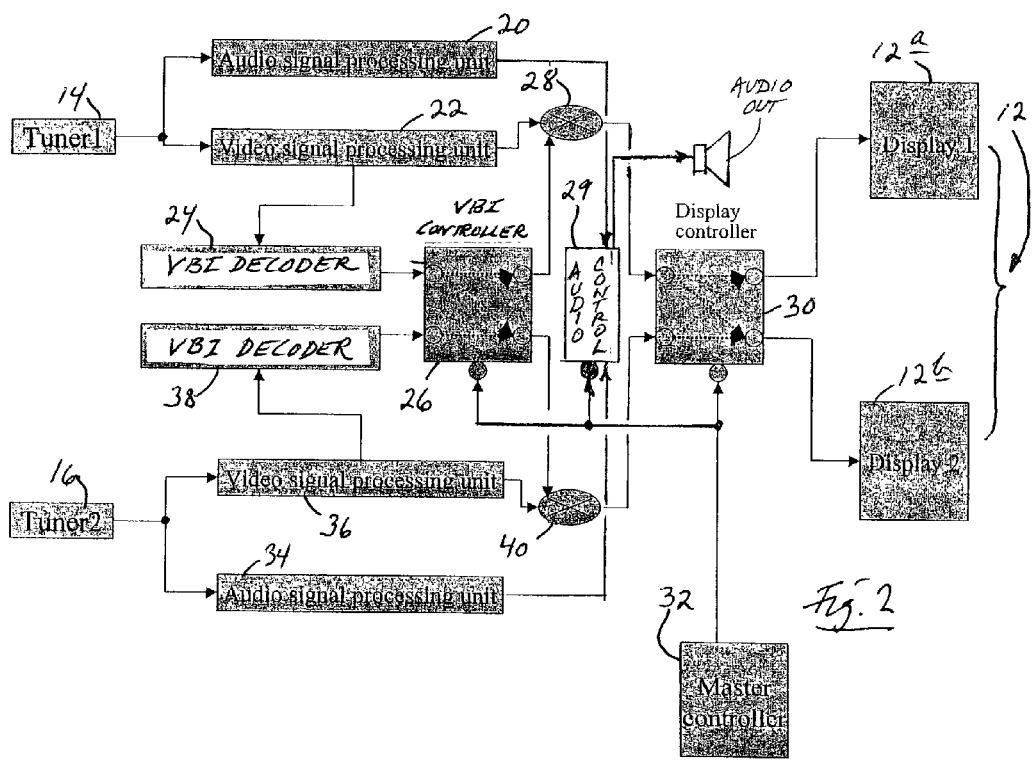
FIG. 2 is a more detailed block/schematic diagram further picturing what is shown more generally in FIG. 1.

FIG. 2 elaborates on what is shown in FIG. 1. Appropriate inter-element control and information flow lines (with arrowheads) are pictured in FIG. 2 in a manner which will fully inform those skilled in the art just how the illustrated portions of receiver 10 are interconnected, and how they interact and cooperate.

Operatively interposed tuner 14 and display screen 12 are an audio processing unit 20, a video signal processing unit 22, a closed caption VBI (vertical blanking interval) decoder 24, a closed caption VBI controller 26, a multiplexer 28, an audio controller 29, a display controller 30, and a master controller 32.

Similarly, operatively interposed tuner 16 and display screen 12 are an audio processing unit 34, a video signal processing unit 36, a closed caption VBI decoder 38, previously mentioned closed caption VBI controller 26, a multiplexer 40, and previously mentioned audio controller 29, display controller 30 and master controller 32. Thus, one can see that there is a definitive symmetry which exists in receiver 10 relative to its two broadcast-source tuners 14, 16.

Selective control over the operation of what is shown in FIG. 2 takes place via the user interface mentioned earlier. Through this interface, appropriate "selection" signals are sent to master controller 32, and through the master controller to closed caption VBI controller 26 to audio controller 29 and to display controller 30. Control signals supplied to VBI controller 26 determine independently whether scrolling text information tuned in by the two tuners is to be sent either to multiplexer 28 or to multiplexer 40. Control signals sent to audio controller 29 determine how audio is routed and handled. Control signals supplied to controller 30 determine whether the information output from multiplexers 28, 40 is sent to create either display style 12a, or display style 12b.

Units 20, 22, 24 function in relation to tuner 14 to segregate and individuate the audio, visual and scrolling text components respectively, which are tuned in by tuner 14. Similarly, units 34, 36, 38 perform the same respective functions in relation to tuner 16.

One can thus now see how the system and methodology of the present invention uniquely allow a user to flex a great deal of freedom and selectivity in establishing simultaneous receptions of selected, individual components of audio, visual and scrolling-textual information being broadcast simultaneously by two different broadcast sources. The proposed system is easily introducible into otherwise conventional television receivers. Equipping a receiver with dual tuners, and with related structures which can selectively separate audio, visual and scrolling text components of broadcast information, and further enabling a user to route these individuated components as individuals, successfully and very conveniently addresses the simultaneous information desires mentioned earlier herein.

Accordingly, while a preferred embodiment and manner of practicing the present invention have been illustrated and described herein, it is appreciated that variations and modifications may be made without departing from the spirit of the invention.

We claim:

1. A plural-source-capable, broadcast-reception, audio/video system comprising
  a display screen,
  a pair of broadcast-source tuners, and
  reception/display control structure operatively interposed said screen and said tuners operable selectively to effect independent interactive behavior between each of said tuners and said display screen, whereby a simultaneous visual display is producible on the screen containing imagery derived through one of said tuners from one broadcast source, and visible text material derived through the other tuner from another broadcast source.

2. The system of claim 1, wherein said control structure includes control substructure operable to enable independent free changing of the sources of displayable broadcast material tuned in respectively by said tuners.

3. The system of claim 2, wherein each tuner is capable of tuning in audio information which is broadcast from a selected source, and said control structure is further operable to enable audio presentation by said system of such audio information.

4. The system of claim 1, wherein each tuner is capable of tuning in audio information which is broadcast from a selected source, and said control structure is further operable to enable audio presentation by said system of such audio information.

5. In a plural-source-capable, broadcast-reception, audio/video system which includes a display screen and a pair of source tuners,
  interconnect structure operatively interposed said screen and said tuners, operable selectively to effect independent interactive behavior between each of said tuners and said display screen, whereby a simultaneous visual display is producible on the screen containing imagery derived through one of said tuners from one broadcast source, and visible text material derived through the other tuner from another broadcast source.

6. A plural-source-capable, broadcast-reception, audio/video display method comprising
   providing a display screen,
   furnishing a pair of broadcast-source tuners, and
   additionally, furnishing reception/display control structure which is operatively interposed the screen and the tuners, and which is operable selectively to effect independent interactive behavior between each of the tuners and the display screen, whereby a simultaneous visual display is producible on the screen containing both imagery derived through one of the tuners from one broadcast source, and visible text material derived through the other tuner from another broadcast source.

* * * * *